United States Patent
Carr

[11] 4,018,247
[45] Apr. 19, 1977

[54] SPRINGLESS BALL VALVE FOR HIGH SPEED COMPRESSORS

[76] Inventor: Clifford H. Carr, 614 W. 67th St., Kansas City, Mo. 64113

[22] Filed: Jan. 12, 1976

[21] Appl. No.: 648,566

Related U.S. Application Data

[63] Continuation-in-part of Ser. No. 553,970, Feb. 28, 1975, abandoned.

[52] U.S. Cl. .................. 137/512.1; 137/533.11; 137/539
[51] Int. Cl.² .................................. F16K 15/04
[58] Field of Search ......... 137/539, 539.5, 533.11, 137/533.13, 533.15, 512.1

[56] References Cited
UNITED STATES PATENTS

| | | | |
|---|---|---|---|
| 1,698,567 | 1/1929 | Small | 137/539 X |
| 1,829,022 | 10/1931 | Stevenson | 137/533.15 X |
| 1,901,217 | 3/1933 | Yerkes et al. | 137/533.13 |
| 2,891,571 | 6/1959 | Sparks | 137/533.11 X |
| 3,148,697 | 9/1964 | Carr | 137/327 |

*Primary Examiner*—William R. Cline
*Attorney, Agent, or Firm*—Lowe, Kokjer, Kircher, Wharton & Bowman

[57] ABSTRACT

A valve body is provided with a plurality of spaced parallel gas passageways which permit flow through the valve body from one face to the other. Each passage is controlled by a ball valve member which permits unidirectional flow only and which unseats and reseats without requiring springs. The balls seat on seats in the form of frusto-conical surfaces having an included angle of approximately 60°, the preferred range being between 55° and 65°. The ratio of ball diameter to the smallest end of the frusto-conical surface is 1.11 to 1. The balls are guided for substantially linear movement on the axis of the conical surface.

3 Claims, 4 Drawing Figures

SPRINGLESS BALL VALVE FOR HIGH SPEED COMPRESSORS

RELATED APPLICATIONS

This application is a continuation-in-part of my co-pending application Ser. No. 553,970, filed Feb. 28, 1975, now abandoned.

BACKGROUND AND SUMMARY OF THE INVENTION

This invention is directed generally to an improvement in valves for gas compressors, and it deals more particularly with provision of a springless discharge valve which has extremely good characteristics of positive action in terms of quick seating with no chatter while still providing a relatively high capacity gas through-put.

In my U.S. Pat. No. 3,148,697, titled "COMPRESSOR VALVE" and which issued Sept. 15, 1964, I disclosed a ball type valve which at that time represented a considerable break through in the art from the standpoint of high capacity and operation at relatively high speeds of operation for the compressor. By high speed reciprocation I refer to those compressors operating in the range of 400 to 1750 strokes per minute. The requirements for a superior discharge valve for such a compressor are positive seating at the instant of pressure reversal, and a maintenance of the ball in firm sealing contact with the seat during compression.

In the years since the development of my patented valve structure, I have devoted considerable effort to improving the structure. The improvement has resulted largely from an effort to obtain a valve which did not require any springs for seating the ball, and which would quickly and positively seat without any "chatter", that is, bouncing of the ball around on the seat thus leaving some opportunity for blow back, particularly at the higher speeds of operation.

In conducting my work along the above lines, I have discovered that there is an extremely critical relationship between the ball and seat which defines the difference between the optimum valve and one which is almost, but not quite, satisfactory. To be effective, the ball must be positively guided to the seating position, and there must be a relationship established such that the ball will not have any opportunity to bounce or rebound. By providing such an arrangement, the valve is one which permits accidental accumulation of liquid without breakage, and in addition, the wear is minimized to the point where a tight seal is maintained over a long period of time.

Such a valve makes it possible to eliminate high discharge temperatures even with high suction temperatures, and there is no danger of spring breakage (and consequent down time for replacement) since no springs whatever are required.

Other objects of the invention together with the advantages which are pertinent thereto will appear during the course of the following description.

DETAILED DESCRIPTION

In the accompanying drawing which forms a part of the specification and is to be read in conjunction therewith, and in which like reference numerals indicate like parts in the various views.

Figure 1:
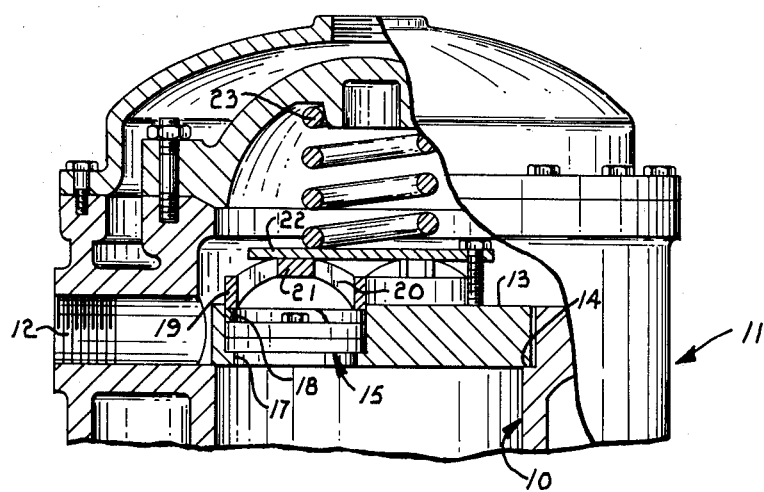
FIG. 1, is a fragmentary side elevation of the upper head portion of a typical compressor equipped with a discharge valve in accordance with the invention, parts being broken away and shown in section for purposes of illustration.

Referring initially to FIG. 1, this figure shows the upper head portion of a typical compressor having an inside cylinder wall 10. While not shown, it will be understood that a piston operates within the cylinder, moving upwardly on the compression stroke and downwardly on the suction stroke. The cylinder body is indicated by reference numeral 11, and it is provided with a discharge port 12 which communicates with the interior of the cylinder. The upper end of the cylinder is closed by a head plate 13 which seats at its bottom margin on an annular shoulder 14 at the top of the cylinder wall.

Located in and carried by the head plate 13 are one or more discharge valves generally identified by reference numeral 15. While further description of the valve will be given in connection with FIGS. 2 through 4, it is noted at this point that the discharge valve is circular in configuration and seats in an aperture 17 formed in the head plate. The valve assembly 15 is held in the seated position by a hold-down ring 18 which engages the rim of the upper portion of the valve assembly and is interposed between the valve assembly and a hold-down member 19. The hold-down member 19 comprises an annular ring having the arched radial webs or spokes 20 which join centrally with a plug portion 21. A pressure plate 22 overlies the plug 21 and serves to transmit thereto the compressive force of the hold-down spring 23. The details of the construction of the compressor play no part in the present invention and FIG. 1 is simply provided to illustrate the mounting of the valve structure in a typical compressor.

Figure 2:
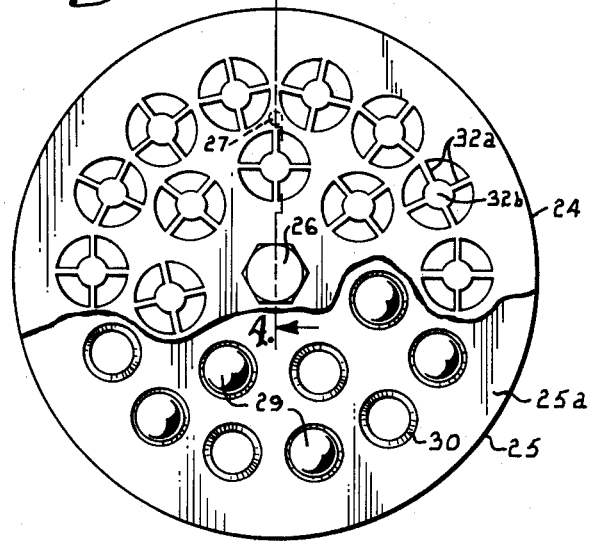
FIG. 2, is a top plan view of the discharge valve, here shown disassociated from the compressor, portions of the top plate of the valve being broken away for purposes of illustration.
Figure 3:
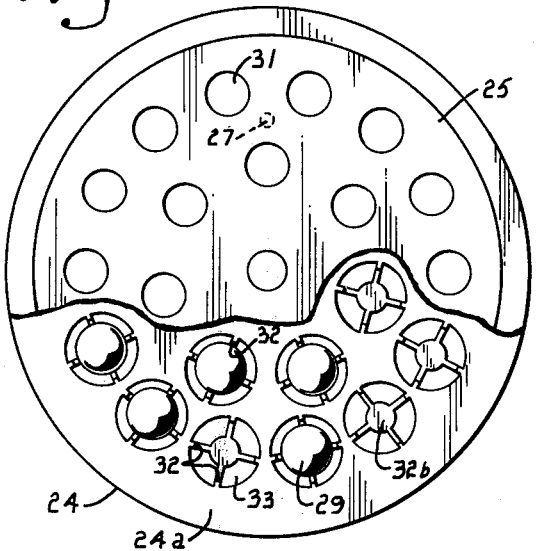
FIG. 3, is a bottom plan view of the discharge valve, parts of the base member of the valve being broken away for purposes of illustration.

Referring now to FIGS. 2 and 3, the principal components of the preferred valve structure comprise a pair of circular plate like members 24 and 25. The bottom face 24a of the top plate number 24 contact the top face 25a of the bottom plate 25; both are machined smooth and flat so as to prevent flow laterally across and between such surfaces. The two parts of the valve are secured together by a bolt 26 located centrally and extending through and screwed into corresponding openings therein. In addition, the lower member 25 is provided with an annular, reduced diameter portion which forms a circumferential shoulder 25b which provides a seating surface to mate with the shoulder around the opening at the top of the cylinder.

Since indexing of the plate members relative to one another is important, at least one dowel pin 27 (FIGS. 2 and 4) is supported by and extends upwardly from the top face 25a into a corresponding opening 28 in the top member 24, thereby to prevent relative rotation of the respective members making up the valve about the bolt holding them together.

The valve members as thus described are further provided with a plurality of gas passages or vents therethrough which are each opened and closed through action of ball 29 positioned within the vent. In FIGS. 2, several of the balls have been removed in order to show the seats for the balls.

Each ball 29 normally seats within and on a frusto-conical surface 30 which is formed in the upper portion of the bottom plate member 25 and which connects with a cylindrical passageway 31 extending to the lower surface. The configuration of the frusto-conical seating surface 30 for the ball has been found to be critical in achieving the desired operation. The angle $a$, which is the included angle defined between intersecting lines contained in the same vertical plane and coinciding with the seat surfaces, is preferably substantially 60°. The optimum results are achieved when the angle is at or about 60°; however, acceptable results for some purposes (depending on variations in speed, pressures and gases) can be achieved when the angle $a$ falls within the range of 55° to 65°.

The preferred ball diameter is only slightly greater than the diameter of the cylindrical passgeway 31; I prefer a ratio of ball diameter to seat diameter (measured at the small end of the frusto-conical surface 30) of 1.11 to 1. The depth of the seat (measured in a vertical direction) is approximately such that the center of the ball is on the same horizontal plane as the top face of the base member 25, with the ball seating to a depth substantially equal to the radius of the ball.

The permissible movement of the balls is controlled by caging and stop surfaces associated with each ball and formed in the upper plate member 24. The caging or guide surfaces are, in the preferred embodiment, four equispaced vertical ribs 32 which are formed on the inside of a ball cavity 33 in the upper plate. The ball confronting surfaces of the ribs or guides 32 are coincident with an imaginary cylinder having the ball as its center and of a diameter equal to the diameter of the upper end of the seating surface 30. With an 11/32 inch diameter ball the diameter of the imaginary cylinder and top of the seat should be about 0.400 inches.

Figure 4:
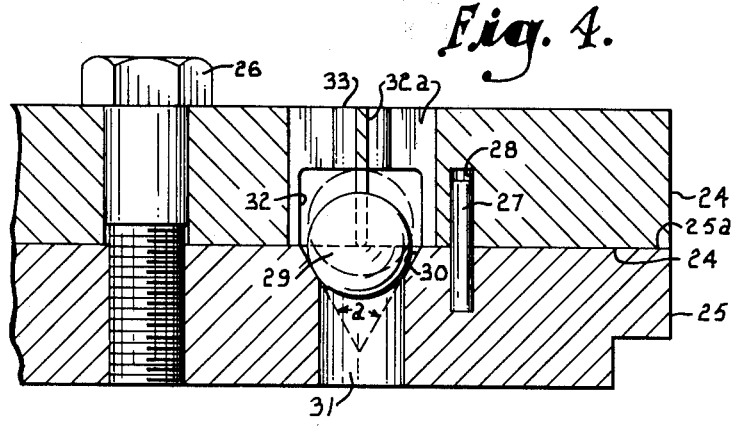
FIG. 4, is a fragmentary sectional view on an enlarged scale taken along line 4—4 of FIG. 2 in the direction of the arrows.

More specifically, and referring to FIGS. 3 and 4, there are in the illustrated embodiment two annular rows of ball cavities or recesses. The ball recesses are indicated at 33. The guides 32 are preferably of a depth of 1/32 inch; cavities have a normal diameter of approximately 15/32 inch.

The guides 32 merge at their upper ends with inwardly extending spoke-like transition sections 32a which connect with a central ball stop 32b which serves as an upper limit stop for vertical movement of the ball. The extent of permitted movement should be enough that when lifted, the cross-sectional area of the space opened to flow pass the balls will be substantially equal to the cross-sectional area of the flow area through the grooves and opening 34 to the exterior of the top plate member.

In operation, during the suction stroke the balls 29 remain seated on the seats since the back pressure from the discharge load exerts a downward force on the balls. The seated position of balls 29 is illustrated in solid lines in FIG. 4. On the compression stroke, the gases in the cylinder are compressed and as a result the balls are lifted from their seats to the position illustrated in the broken lines in FIG. 4. The lifting of the ball elements opens the flow paths past the balls and seats, permitting the gas to move upwardly around and past the balls and through the openings between the transition sections 32a to discharge. The balls remain in the upper or "lifted" position during the compression stroke. Upon reversal from compression to intake, a quick pressure reversal takes place in the cylinder, the pressure within the cylinder becoming much less than that exerted on the balls from above. As a result, the ball is impelled downwardly. As it moves downwardly it is intercepted by the conical seat surface and is quickly and positively guided into the seated position without any opportunity for "chatter" or bouncing. As I previously have indicated, I have found that the angle and dimensioning of the seat is critical to the success of operation of the valve without any springs being required to return the valve to the seated position. Lesser angles results in the potential of sticking of the ball whereas greater angles tend to result in bouncing and "chattering" neither of which are acceptable in the valve of this type.

While I have disclosed a cast valve as the illustrated embodiment, i.e., one easiest obtained by investment casting, it is possible to obtain approximately the same results through a valve construction in which the guide members are formed by trepanning, as in the Sparks U.S. Pat. No. 2,891,571.

It further should be known that the invention disclosed herein is useful also in suction valves and I do not intend the invention to be limited to discharge valves alone.

It will be understood that certain features and subcombinations are of utility and they may be employed without reference to other features and subcombinations, this is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A unidirectional flow control valve for high speed gas compressors, said valve including
   a plurality of loose balls arranged in gas passages through the valve and operable to seat and unseat in response to pressure reversal relative to the balls,
   each said ball operably supported to be lifted from and return to a seated sealing position in a seat, each said ball further being free from any mechanical constraints against upward movement, other than its own weight, when in the seated position,
   each said seat comprising a frusto-conical surface with respect to which the ball is centered, the included angle of said frusto-conical surface falling within a range of from about 55° to about 65°, the ratio of the diameter of the ball to the smallest end of the frusto-conical surface being about 1.11 to 1,
   each said passage further including a chamber above the seat having a diameter greater than the ball, and guide means within the chamber for confining movement of the ball to a substantially vertical path of movement.

2. A flow control valve as in claim 1, in which said included angle is substantially 60°.

3. A flow control valve as in claim 1, in which the center of each ball is in substantially the same plane as the largest end of the seat.

* * * * *